Jan. 20, 1959     D. W. MOORE     2,869,367

FORCE-RATIO-RESPONSIVE SYSTEM

Filed May 31, 1955

United States Patent Office 2,869,367
Patented Jan. 20, 1959

2,869,367

FORCE-RATIO-RESPONSIVE SYSTEM

David W. Moore, Pacific Palisades, Calif., assignor to Servomechanisms, Inc., a corporation of New York Application May 31, 1955, Serial No. 511,974

4 Claims. (Cl. 73—182)

This invention relates to force-ratio-responsive systems and, while it is of general application, it is particularly applicable to force-ratio computers and will be specifically described as applied to a Mach number computer for aircraft.

In many computing apparatuses, such as computers for fire control, ballistic trajectories, Mach number computers, etc., there is involved the problem of developing an accurate response to a ratio between two forces. In certain of such apparatuses, such forces are measured directly and their values manually introduced into a computer by the operator. Obviously such an operation is time consuming and subject to human error.

It is an object of the present invention, therefore, to provide a new and improved force-ratio-responsive system which is responsive directly and automatically to the ratio of two forces and which develops an effect representative of such ratio.

It is another object of the invention to provide a new and improved force-ratio-responsive system suitable for use directly in electrical or mechanical computers.

It is a specific object of the invention to provide a new and improved force-ratio-responsive system suitable for use as a Mach number computer for an aircraft.

In accordance with the invention, there is provided a system for developing an effect representative of the ratio of two forces which comprises a synchro having a pair of electrically spaced exciting windings and a rotor winding, means for developing first and second electrical signals individually varying with the two forces, circuits for individually applying such electrical signals to the synchro exciting windings, and servo means responsive to the signal developed in the synchro rotor winding for adjusting the same to reduce the signal therein substantially to zero, the position of the synchro rotor winding being representative of the ratio of the two forces.

More specifically in accordance with the invention, there is provided a system for computing the Mach number of an aircraft in flight which comprises a first fluid-pressure device responsive to static air pressure for developing a first electrical signal varying therewith, a second fluid-pressure device responsive to impact air pressure for developing a second electrical signal varying therewith, a synchro having a pair of electrically spaced exciting windings individually excited by the developed electrical signals and having a rotor winding, and servo means responsive to the signal developed in the synchro rotor winding for adjusting the same to reduce such signal therein substantially to zero, the position of the synchro rotor winding being representative of the desired Mach number.

For a better understanding of the present invention, together with other and further objects thereof, reference is had to the following description taken in connection with the accompanying drawing, while its scope will be pointed out in the appended claims.

Referring now to the drawing:

Fig. 2 is a vector diagram to aid in an understanding of the invention; while

Figure 1:
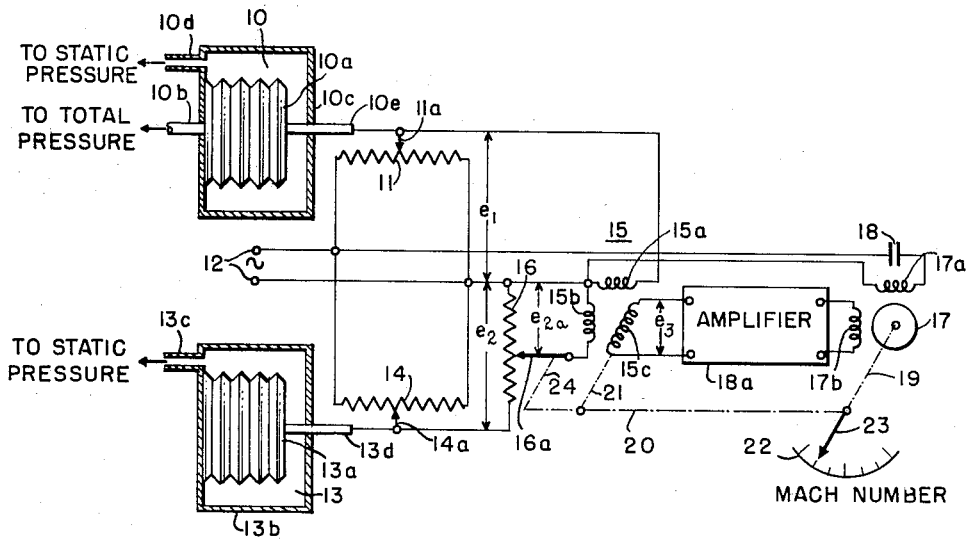
Fig. 1 is a schematic representation of a simple form of force-ratio responsive system embodying the invention.

Referring now to Fig. 1 of the drawing, there is represented a system for developing an effect representative of the ratio of two forces, for example, the ratio of two fluid pressures which is also representative of the Mach number of an aircraft in flight. This system includes means for developing first and second electrical signals individually varying with such two forces. This means comprises a fluid-pressure device such as a fluid-pressure-responsive transducer 10 responsive to static air pressure for developing a first electrical signal varying therewith. The transducer 10 may be of any suitable type and is shown in simplified form as comprising a Sylphon bellows 10a having a fluid connection or coupling 10b to a source of total or impact air pressure, such as may be developed by a Pitot tube on an aircraft. The bellows 10a is enclosed in a housing 10c having a fluid connection or coupling 10d to a source of static air pressure, such as developed by the Pitot tube on an aircraft. An actuator rod 10e is connected to be actuated by the bellows 10a, which is effective to develop a force varying with the difference in pressures within the bellows 10a and the housing 10c, that is, a differential pressure representative of the air speed of the aircraft. The actuator 10e is connected to an adjustable contact 11a of a voltage-divider resistor 11 connected to alternating-current supply terminals 12, which may be the usual 400-cycle power line available on an aircraft.

The electrical signal developing means also includes a second fluid-pressure device, such as a fluid-pressure-responsive transducer 13, which may also be of any suitable type and is shown in simplified form as including a hermetically sealed Sylphon bellows 13a enclosed within a housing 13b having a fluid connection or coupling 13c to the same source of static pressure as the connection 10b. The bellows 13a is connected to an actuator rod 13d which, in turn, is connected to an adjustable contact 14a of a voltage-divider resistor 14 connected across the supply terminals 12.

The system of the invention also includes a synchro 15, that is, an electrodynamic machine having a stator carrying a pair of electrically spaced, specifically quadrature spaced, distributed exciting windings 15a and 15b adapted to be energized by alternating voltages of the same phase so that they develop a stationary alternating field of a phase depending upon the relative magnitudes of the excitations of the two windings. Such a synchro also includes a rotor having a winding such as the winding 15c which is normally unexcited and develops an alternating voltage of an amplitude dependent upon the relative angular positions of the stator and the rotor. The system also includes circuits for individually applying the electrical signals developed by the transducers 10, 13 to the windings 15a, 15b, respectively, these circuits being completed from a common one of the terminals 12 and from the adjustable contacts 11a and 14a, respectively, the latter connection including a voltage-divider resistor 16 having an adjustable contact 16a for a purpose described hereinafter.

The force-ratio-responsive system of the invention also includes servo means responsive to the signal developed in the rotor winding 15c, this servo means being shown as a servomotor 17 having a phase winding 17a connected to a source of constant excitation, for example, the terminals 12, through a phase-shifting condenser 18 and a second phase winding 17b excited from the rotor winding 15c through a power amplifier 18a of conventional form and any desired number of stages. The servomotor is connected to adjust the rotor winding 15c to such a position as to reduce the signal therein substantially to zero, the connection being shown schematically by the mechanical links 19, 20, 21 which may take the form of a simple gear connection from the shaft of the motor 17 to the rotor carrying winding 15c. As will be explained hereinafter, in such a system the position of the rotor winding 15c at balance is representative of the ratio of the electrical signals developed by the transducers 10 and 13 and of the Mach number of the aircraft in flight. Since this is true, the system includes an indicating device comprising a scale 22 and an associated pointer 23 also driven by the motor 17 correspondingly with the rotor winding 15c.

As explained hereinafter, the indication given by the device 22, 23 is not a linear representation of the ratio of the resultant pressures applied to the transducers 10 and 13. If desired, therefore, the force-ratio-responsive system of the invention may optionally include means for adjusting the value of one of the developed electrical signals as a function of the position of the rotor winding 15c to calibrate the ratio representation. Specifically, the force-ratio or Mach number representation may be made to represent any desired function of the input pressure ratio. For example, this feature of the invention may be utilized to provide an output representation which varies linearly with the input pressure ratio, thereby imparting a uniform sensitivity to the system over its range of operation and facilitating calibration of the reading of its indicating device over the entire scale. This linearizing means comprises the resistor voltage divider 16 connected to be excited by the voltage developed by the transducer 13, that is, by connection across the adjustable contact 14a and the common one of the terminals 12. The adjustable contact 16a is connected to be adjusted in correspondence with the rotor winding 15c, as represented schematically by the connection 24, and the voltage-divider resistor 16 has a resistance-displacement characteristic proportioned to linearize the indication of the ratio of the pressures applied to the transducers 10 and 13, that is, to linearize the Mach number representation.

The operation of the above-described force-ratio-responsive system may be briefly explained as follows: the transducer 10 produces a displacement of its actuator 10e, and thus an electrical signal $e_1$ at adjustable contact 11a, which varies with the differential pressure applied thereto, that is, the total pressure $P_t$ minus the static pressure $P_s$. Similarly, the transducer 13 produces a displacement of its actuator 13d and the connected contact 14a to develop an electrical signal $e_2$ varying with the static pressure $P_s$. Neglecting for the moment the operation of the voltage-divider resistor 16 and assuming that the adjustable contact 16a is at the lower end of the divider 16, it is seen that the voltages applied to the windings 15a, 15b of the synchro 15 may be represented by the vector diagram of Fig. 2, the voltages $e_1$ and $e_{2a}$ being shown in quadrature because of the quadrature space relation of the two windings. The maximum voltage $e_3$ developed in the rotor winding 15c occurs when the axis of the winding 15c is in line with the vector $e_3$ of Fig. 2. Obviously, when the winding 15c is in a position normal to that represented by the vector $e_3$, the voltage developed thereby is zero.

The voltage $e_3$ is applied to the amplifier 18 and thence to the winding 17b of the servomotor 17. At the same time, the winding 17a of the servomotor is excited from the constant source or terminals 12 through the phase-shifting condenser 18. As is well understood in the art, under these conditions the servomotor 17 will be actuated whenever there is any appreciable voltage $e_3$ applied to its winding 17b. The servo loop is completed by way of the mechanical connections 19, 20, 21 from the servo motor 17 to the winding 15c to re-adjust the latter until the voltage developed thereby is substantially zero when the system is in equilibrium.

Figure 2:
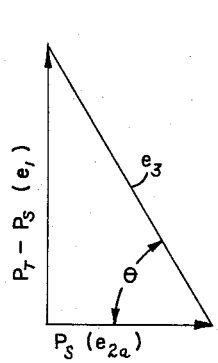

For convenience, the angular position $\theta$ of the rotor winding 15c may be measured with reference to its position in which the axis of this winding is normal to the vector $e_3$ of Fig. 2. Under these circumstances then, the system will always balance at a position such that:

$$\text{Tan } \theta \alpha \frac{P_t - P_s}{P_s} \tag{1}$$

or $$\theta \alpha \tan^{-1}\left(\frac{P_t - P_s}{P_s}\right) \tag{2}$$

these equations being represented by the vector diagram of Fig. 2.

Figure 3:
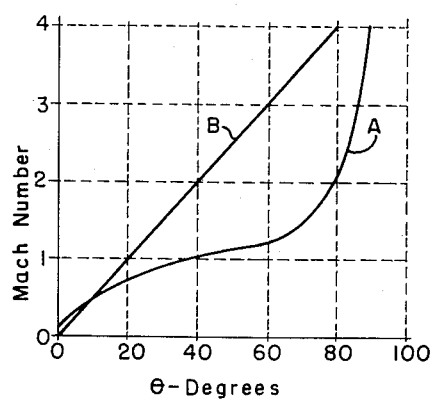
Fig. 3 is a graph of certain operating characteristics of the system represented by Fig. 1.

As mentioned above, in the system as so far described, the angular position of the rotor winding 15c, and thus the indication of the device 22, 23, is not linearly representative of the ratio $(P_t - P_s)/P_s$ but has a response characteristic represented by curve A of Fig. 3. This curve indicates that the sensitivity of the system is considerably lower than average for small angles of deflection and considerably higher than average for large angles of deflection. This response characteristic is linearized by the inclusion of the voltage-divider resistor 16 between the transducer 13 and the winding 15b of the synchro.

Curve A of Fig. 3 can be represented by the following equation:

$$\theta = \tan^{-1}\frac{(P_t - P_s)}{P_s(f(\theta))} \tag{3}$$

The response characteristic of the system may be converted from that of curve A to a linear response represented by curve B of Fig. 3 by predetermining the resistance-displacement characteristic of the voltage-divider resistor 16 as $(f(\theta))$. This determination of the characteristic of the voltage-divider resistor 16 is made empirically. The desired linear curve B is selected, the normal response characteristic curve A is measured, and the value of $(f(\theta))$ is then determined either graphically or arithmetically for a number of positions of winding 15c and corresponding adjustment points of the adjustable contact 16a. These points are then connected graphically to form a smooth curve to which the resistance-displacement characteristic of the resistor divider 16 is made to correspond.

It is obvious that the linearization of the resistance characteristics may be effected by modifying the electrical signal $e_1$, or both electrical signals $e_1$ and $e_2$ simultaneously, if this simplifies the design of the voltage-divider resistor.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed:

1. A system for developing an effect representative of the ratio of two forces comprising: a synchro having a pair of electrically spaced exciting windings and a rotor winding; means for developing first and second electrical signals individually varying with said forces; circuits for individually applying said electrical signals to said exciting windings; servo means responsive to the signal developed in said rotor winding for adjusting the same to reduce said signal therein substantially to zero, the position of said rotor winding being representative of said ratio; and a resistance voltage divider connected to be excited by one of said electrical signals, said voltage divider having an adjustable contact, said contact being connected to its associated synchro winding, said contact being connected to be adjusted by said rotor winding and said voltage divider having a resistance-displacement characteristic proportioned to linearize said ratio representation.

2. A system for computing the Mach number of an aircraft in flight comprising: a first fluid-pressure device responsive to static air pressure for developing a first electrical signal varying therewith; a second fluid-pressure device responsive to impact air pressure for developing a second electrical signal varying therewith; a synchro having a pair of electrically spaced windings individually excited by said electrical signals and having a rotor winding; servo means responsive to the signal developed in said rotor winding for adjusting the same to reduce said signal therein substantially to zero, the position of said rotor winding being representative of the desired Mach number; and means for adjusting the value of at least one of said electrical signals as a function of the position of said rotor winding to linearize said Mach number representation.

3. A system for developing an effect representative of the ratio of two forces including two alternating current voltage supply lines; a first potentiometer having a resistance element and a movable contactor, said resistance element being connected between said voltage supply lines; a second potentiometer having a resistance element and a movable contactor, said resistance element being connected between said voltage supply lines; means responsive to one of said two forces for moving the contactor of the first potentiometer; means responsive to the other said two forces for moving the contactor of the second potentiometer; a third potentiometer having a resistance element and a movable contactor, the said resistanace element being connected between one of said voltage supply lines and the contactor of said second potentiometer; a synchro having stator windings comprising a pair of electrically spaced distributed exciting windings and a rotor winding; said stator windings having a common terminal and separate end terminals, said common terminal being connected to one of said voltage supply lines and said separate end terminals being connected between the contactor of the first potentiometer and the contactor of the third potentiometer; and a servo motor having an output shaft connected to said rotor winding and to the contactor of the third potentiometer, said servomotor being responsive to the signal developed in said rotor winding for adjusting said signal therein substantially to zero and the position of said rotor winding at substantially zero signal being representative of said ratio.

4. A system for computing the Mach number of an aircraft in flight, including two alternating current voltage supply lines; a first potentiometer having a resistance element and a movable contactor, said resistance element being connected between said voltage supply lines; a second potentiometer having a resistance element and a movable contactor, said resistance element being connected between said voltage supply lines; a static pressure transducer connected to the contactor of one of said potentiometers; a differential pressure transducer connected to the contactor of the other of said potentiometers; a third potentiometer having a resistance element and a movable contactor, the said resistance element being connected between one of said voltage supply lines and the contactor of one of said first two mentioned potentiometers; a synchor having stator windings comprising a pair of electrically spaced distributed exciting windings and a rotor winding; said stator windings having a common terminal and separate end terminals, said common terminal being connected to one of said voltage supply lines and said separate end terminals being connected between the contactor of the other of said first two mentioned potentiometers and the contactor of the third potentiometer; and a servomotor having an output shaft connected to said rotor winding and to the contactor of the third potentiometer, said servomotor being responsive to the signal developed in said rotor winding for adjusting said signal therein substantially to zero and the position of said rotor winding at substantially zero signal being representative of the computed Mach number.

References Cited in the file of this patent

UNITED STATES PATENTS

| | | |
|---|---|---|
| 2,536,495 | Ewing | Jan. 2, 1951 |
| 2,694,927 | Colbourn et al. | Nov. 23, 1954 |
| 2,728,882 | Cohen | Dec. 27, 1955 |
| 2,806,353 | Grafinger | Sept. 17, 1957 |